US012795336B1

(12) United States Patent
Astwood et al.

(10) Patent No.: US 12,795,336 B1
(45) Date of Patent: Nov. 10, 2026

(54) USING Wi-Fi SIGNALS TO ELIMINATE SENSORS WITHIN A RESIDENCE

(71) Applicant: UIPCO, LLC, San Antonio, TX (US)

(72) Inventors: Paul J. Astwood, San Antonio, TX (US); Deborah J. Schulz, San Antonio, TX (US); Jeorge Fabre, San Antonio, TX (US); Janelle D. Dziuk, Falls City, TX (US); Susan E. Wright, San Antonio, TX (US); Edward Manuel Alonzo, III, San Antonio, TX (US); Matthew R. Santacroce, Rio Rancho, NM (US)

(73) Assignee: United Services Automobile Association (USAA), San Antonio, TX (US)

( * ) Notice: Subject to any disclaimer, the term of this patent is extended or adjusted under 35 U.S.C. 154(b) by 442 days.

(21) Appl. No.: 17/816,973

(22) Filed: Aug. 2, 2022

(51) Int. Cl.
*H04W 4/38* (2018.01)
*H04W 64/00* (2009.01)

(52) U.S. Cl.
CPC ........... *H04W 4/38* (2018.02); *H04W 64/003* (2013.01)

(58) Field of Classification Search
CPC ................ G08B 25/016; H04M 11/04; H04M 2242/04; H04W 4/90; H04W 76/50
See application file for complete search history.

(56) References Cited

U.S. PATENT DOCUMENTS

| | | | | |
|---|---|---|---|---|
| 11,232,870 | B1 * | 1/2022 | Shaashua | G16H 50/30 |
| 11,576,010 | B1 * | 2/2023 | Acklen | H04W 4/022 |
| 2014/0075464 | A1 * | 3/2014 | McCrea | H04L 67/75 709/206 |
| 2020/0004435 | A1 * | 1/2020 | Borlick | G06N 3/084 |
| 2021/0224754 | A1 * | 7/2021 | Zarakas | G06N 20/00 |
| 2022/0116761 | A1 * | 4/2022 | Dames | H04L 67/146 |
| 2022/0277630 | A1 * | 9/2022 | Vazirani | G08B 15/00 |
| 2022/0304577 | A1 * | 9/2022 | Tunnell | G08B 21/0453 |

* cited by examiner

*Primary Examiner* — Charles N Appiah
*Assistant Examiner* — Frank E Donado
(74) *Attorney, Agent, or Firm* — BakerHostetler

(57) ABSTRACT

A system for using wireless signals and other wireless device related information which may reduce the need of various external sensors while determining a behavioral pattern.

16 Claims, 4 Drawing Sheets

300

USING Wi-Fi SIGNALS TO ELIMINATE SENSORS WITHIN A RESIDENCE

TECHNICAL FIELD

Systems, apparatuses, or methods for using Wi-Fi signals as an alternative for conventional sensors.

BACKGROUND

Many forms of object detection, motion detection and activity recognition exist today, including optical and thermal/infrared cameras, passive/active infrared motion detectors, acoustic sensors, vibration sensors, cameras, induction coils, and radio frequency (RF) sensors. These technologies can be useful in applications such as security, home automation, elderly and child monitoring, and others.

One of several challenges of existing object detection, motion detection and activity recognition technologies is the requirement to deploy additional network infrastructure in order to support sensor communication, increasing cost and complexity. Conventional technologies also often do not fully utilize data that is already available even where it can be accessed without additional infrastructure.

SUMMARY

The disclosed subject matter may determine the state of a user or an area by utilizing measurements of wireless systems and devices that are generally used for communication purposes. In an example, an apparatus may include a processor and a memory coupled with the processor that effectuates operations. The operations may include monitoring wireless signal data (e.g., wireless signal patterns) within a residence; monitoring other data from the residence (e.g., phone use); correlating wireless signal data and other data to determine behavior; storing the wireless signal data in a blockchain; monitoring the wireless signal data to detect an event (e.g., incident); and executing an action related to the event.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION

Wireless devices with a plurality of internal sensor are pervasive. Adults, children, residences, business, vehicles, parks, and more may have an associated wireless device ID and signal. The disclosed subject matter provides for ways in which to use wireless device related information to automatically detect and react to events associated with a user or area without extensive external sensors, but also allowing for certain enhancements by using a combination of other externals, such as existing cameras. The methods herein may be iterative and incorporate machine learning algorithms in order to increase the accuracy of the pattern recognition and description and execution of an action.

Such patterns cannot often be perceived by humans because the amount of data is overwhelming, the patterns are too subtle or crowded among other patterns, or humans are not capable of receiving and interpreting data from various electronic sensors. Conventional technology to date may look at a limited amount of data available (e.g., using smart phone sensors) but fails to incorporate and synthesize data from other sources. In doing so, patterns or events can be missed, or false positives for patterns and events may be identified when utilization of additional data would avoid such a false positive. This disclosure utilizes unconventional techniques in, e.g., data aggregation and machine learning, to provide a technological improvement overcoming the shortcomings of sensor systems having narrower views or analyzing smaller amounts of data.

Figure 1:
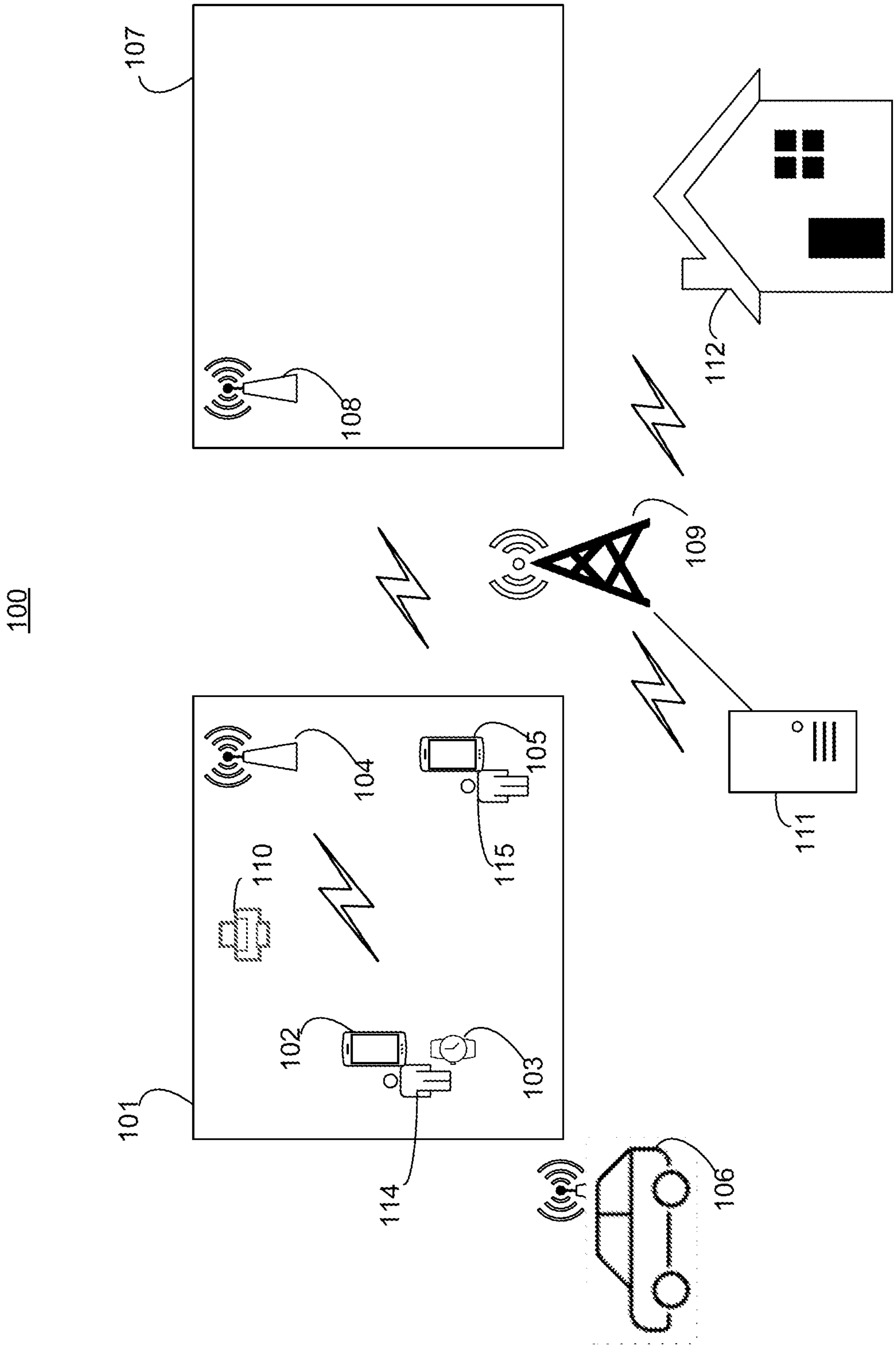
FIG. 1 illustrates an exemplary system that may enable systems for Wi-Fi signals to eliminate sensors within a residence.

The disclosed subject matter may enable the use of wireless signals (e.g., Wi-Fi signals) and other wireless device related information to reduce the need of various external sensors within a residence, business, or other area. FIG. 1 illustrates an exemplary system to eliminate sensors as disclosed herein. System 100 may include a plurality of structures, such as residence 101, residence, 107, or residence 112. Each residence may include a plurality of devices. In an example, residence 101 may include mobile phone 102, smart wearable 103 (e.g., smartwatch, smart ring, or smart glasses), base station 104, printer 110, or mobile device 105, among other devices (e.g., smart displays, smart speakers, etc.). Mobile phone 102 or smart wearable 103 may be associated with user 114 that is linked to a first user profile, while mobile device 105 may be associated with user 115 that is linked to a second user profile. In another example, residence 107 may include base station 108, among other devices (not shown). System 100 may include a plurality of other devices such as vehicle 106, base station 109, or server 111. Server 111 may receive and analyze wireless device related information in order to predict or determine events. The plurality of devices of system 100 may be communicatively connected with each other via wired or wireless communication. Vehicle 106 may be associated with user 114 and may connect with other devices via wireless communication, such as Wi-Fi or 5G. In an example scenario, vehicle 106, may be an unmanned aerial vehicle or an autonomous terrestrial vehicle (e.g., SAE Intl level 3 to level 5 automation).

The plurality of devices of system 100 may send, receive, or store wireless device information, which may be obtained by a plurality of internal sensors. The stored or communicated information may include signal strength information (e.g., received signal strength indictor-RSSI), wireless device identifier (ID), location information (e.g., GPS information), accelerometer information, barometer information, altimeter information (e.g., altitude), or gyroscope information, among other things. It is contemplated herein that the signal strength or wireless device ID, among other information, may be based on connected devices or discoverable devices. For example, mobile phone 102 may be connected with base station 104 and transfer data, but mobile phone 102 may receive wireless device information from base station 108 (e.g., Wi-Fi) or mobile device 105, which are discoverable and not connected with mobile device 102.

It is contemplated that an area may be inside a building, outside a building or a combination of both. In addition, although Wi-Fi signals are featured herein, other wireless signals may be used to implement the same or similar systems.

Figure 2:
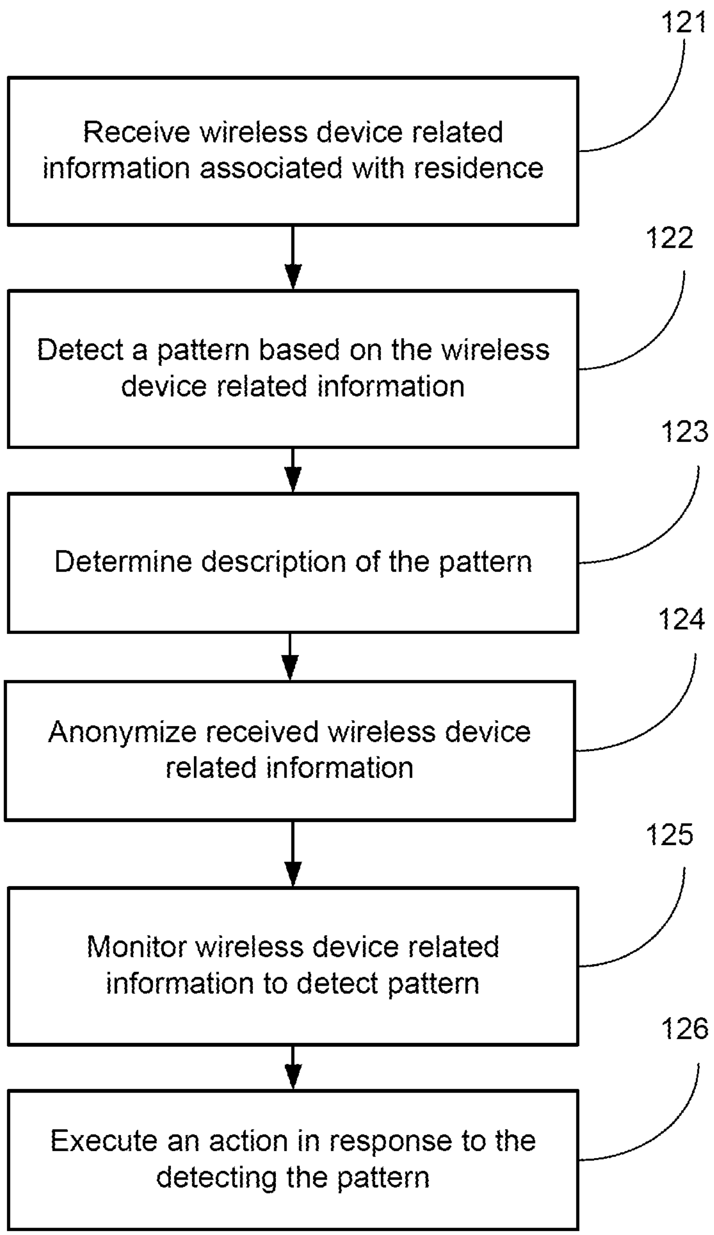
FIG. 2 illustrates an exemplary method that may enable systems for Wi-Fi signals to eliminate sensors within a residence.

FIG. 2 illustrates an exemplary method that may enable a system to eliminate sensors as disclosed herein. At step 121, server 111 may receive wireless device related information associated with residence 101. As disclosed, residence 101 may include smart wearable 103, mobile device 102, mobile device 105, printer 110, or base station 104. Server 111 may receive wireless device related information associated with a plurality of devices which may or may not be located in residence 101. For example, server 111 may receive wireless device related information, such as shown in Table 1, from smart wearable 103. Other wireless device related information from smart wearable 103 may include location information, accelerometer information, barometer information, altimeter information, or gyroscope information, among other things. The wireless device related information may be received over an extended time period.

TABLE 1

| Smart Wearable | | | | |
|---|---|---|---|---|
| Name | RSSI (0 to 100 scale) | Timestamp Connect/ Disconnect | Timestamp Discoverable/ Not | Wireless ID |
| Printer 110 | 85 | t0 | t1 | ID #1 |
| Base Station 104 | 80 | t1 | t1 | ID #2 |
| Base Station 108 | 60 | | t1 | ID #3 |
| Base Station 109 | 50 | | t1 | ID #4 |
| Mobile Phone 102 | 90 | | t1 | ID #5 |
| Mobile Device 105 | 85 | | t1 | ID #6 |
| Vehicle 106 | 80 | t2 | t1 | ID #7 |

At step 122, server 111 may detect a pattern (e.g., behavior pattern of user 114) based on the wireless device related information. A pattern may be detected by using machine learning and may be based on wireless device related information from one device (e.g., just information obtained by smart wearable 103) or wireless device related information from multiple devices (e.g., obtained from memory of smart wearable 103, mobile device 102, mobile device 105, printer 110, or base station 104). These patterns may be considered triggers or thresholds that may be used to determine behavior that is occurring and what action if any may be executed.

At step 123, a description (e.g., label) of the pattern may be determined. For example, in addition to the wireless device related information disclosed above, there may be electronic calendar information, SMS information, or electronic mail information used with the other wireless device related information to help determine the appropriate description. In a first scenario, server 111 may detect, on a Friday night, a smart television connection to base station 104, a location of smart wearable 103 in family room of residence 101, and discoverable connection to an unknown device near or inside residence 101. On this Friday night, an alert message may be sent to smart wearable 103. The alert may be to warn user 114 associated with smart wearable 103 of a possible intruder or trespasser within or near residence 101. This alert may include a request for instructions, such as whether to call public safety (e.g., police), to label the unknown device (e.g., best friend, burglar, or stalker), or to label the event (e.g., movie night or trespasser). In this example, it may just be a "movie night with a friend" and this may be automatically and proactively be added to an electronic calendar based on machine learning. In addition to being added to the electronic calendar of user 114, tailored advertisements (e.g., an offer to deliver popcorn or the like foods) may be sent to smart wearable 103 and the previously unknown device, when detected in similar situations. Alternatively, there may be an intruder in residence 101. Here, information (e.g., wireless device ID) may be saved about the intruder's device (e.g., user 115 with mobile device 105) and by using machine learning determine that the description should be "intruder alert," which may cause emergency personnel to immediately to be contacted or certain devices to be activated (e.g., an alarm, light, or camera). In an example, there may be a direction or other pattern information which intruders or trespassers may approach residence 101 (e.g., from the backyard instead of the front yard).

With continued reference to step 123, in another scenario, as discussed with the previous scenario, there may be a determined pattern associated with a movie night on Fridays. Server 111 may receive gyroscope or accelerometer information from smart wearable 103 or mobile phone 102 that indicates that user 114 may have fallen on the ground. In addition, location information for smart wearable 103 or mobile phone 102 may indicate that user 114 is not in the family room (e.g., maybe a stairwell) and has not moved in several minutes (e.g., 10 minutes). In this example, an alert may be sent to smart wearable 103 or mobile phone 102 to request a status, such as whether assistance is needed or not, or automatically connect smart wearable 103 or mobile phone 102 with persons (e.g., user 115) that are detected nearby or emergency personnel. If assistance is needed, the description may be saved as "fallen" or the like. This event also may be logged and recorded on an electronic calendar for future reference. Other example descriptive events that may generally occur may include party (which may or may not be authorized by the owner of residence 101), falls, trespasser, family dinner, sporting activity, power outage (e.g., several devices in residences are not discoverable), or the like.

At step 124, the wireless device related information, patterns, pattern descriptions, or other information may be anonymized and saved in a blockchain (see FIG. 4) which may be used in machine learning analysis across users to help more quickly assess situations and execute actions. The blockchain may be used as a public ledger to store any type of information. Although, usually known for financial transactions, the blockchain may store any type of information including assets (e.g., products, packages, services, status, etc.). The blockchain may be used to securely store any type of information in its immutable ledger. The blockchain may store information from several areas (e.g., several residences) or users.

At step 125, server 111 may monitor received wireless device information to detect whether a pattern threshold event has occurred, which may be during a period subsequent to step 124. At step 126, server 111 may execute an action in response to the detecting the pattern threshold event. As disclosed herein, an action may be an alert sent to one or more devices. The alert may include, for example, warning message for an undesirable user (e.g., user 115) near user 114, welfare check message regarding user 114, an indication that a party (or like social gathering) may be occurring at residence 101 (e.g., several confirmed connections through base station 104 when user 114 is out of town), update an electronic calendar, communicate (text/call/email) emergency contact, or communicate other unusual activity around residence 101 or unusual activity around user 114 (e.g., near or away from residence 101).

The disclosed subject matter may assist in reducing the number of separate sensors in a residence, business, or other area. For example, much of the information, as disclosed, is received from mobile devices, base stations, or the like. Event descriptions may be extrapolated just from wireless device related information, or the use of wireless device related information and other external sensor information. In an example, wireless device signal information may trigger a device (e.g., camera, light, audio alarm, door locks) to be proactively activated (e.g., awaken from a sleep mode or another alert position). With regard to a camera, the camera may be activated in order to capture video or audio.

Although Wi-Fi based systems are disclosed herein, it is contemplated that some of the subject matter may be implemented without the use of Wi-Fi technology in the manner described. The disclosed subject matter may be used for Wi-Fi, Bluetooth, 5G, or other wireless scenarios. The disclosed subject matter may be used for detecting trespassers during evacuation, monitoring homes while a family has indicated they are on vacation, monitoring businesses (patterns may be related to the type of business), or ensuring all expected members are out of residence 101 during an evacuation, among other things. As disclosed, the system may use blockchain to assist with monitoring the wireless related information, storing the wireless related information, and determining which action to execute. The disclosed subject matter may be used for general security of a location or specifically tailored security, particularly during periods where sensitive transactions scenarios are taking place. It is contemplated herein that wireless device related information may vary based on the type of wireless device, such as mobile phone, M2M sensor/thermostat, laptop, desktop, LAN base station, WAN base station, smart speaker, smart display, etc.

The present disclosure is not limited in any way to the examples, which can be applicable in various forms, as appreciated by one skilled in the art. Therefore, it is to be understood that any terms, phrases, structural and functional details, disclosed herein are merely a basis for the claims and as a representative for teaching one skilled in the art to variously employ the present disclosure.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof as known to those skilled in the art, and so forth. In addition, the use of the word "or" is generally used inclusively unless otherwise provided herein.

One skilled in the art will appreciate further features and advantages based on the described examples. Accordingly, the disclosure is not to be limited by what has been particularly shown and described, except as indicated by the appended claims. Further, although at least one series of steps are presented as an exemplary method of practicing one or more examples described herein, it will be appreciated by those skilled in the art that the steps identified may be practiced in any order that is practicable, including without limitation the omission of one or more steps.

It is to be appreciated that system 100 depicted in FIG. 1, for example, may include a local area network (LAN), a wide area network (WAN), a personal area network (PAN), or combinations thereof. Such networking environments are commonplace in offices, enterprise-wide computer networks, intranets, and the Internet. For instance, when used in a LAN networking environment, system 100 is connected to the LAN through a network interface or adapter (not shown). When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to system 100, or portions thereof, may be stored in a remote memory storage device such as storage medium. Computing devices may communicate over networks through one or more communications links formed between data interfaces. Communication links may comprise either wired or wireless links. It is to be appreciated that the illustrated network connections in the figures (e.g., FIG. 1 or FIG. 3) are exemplary and other ways of establishing a communications link between multiple devices may be used.

Figure 3:
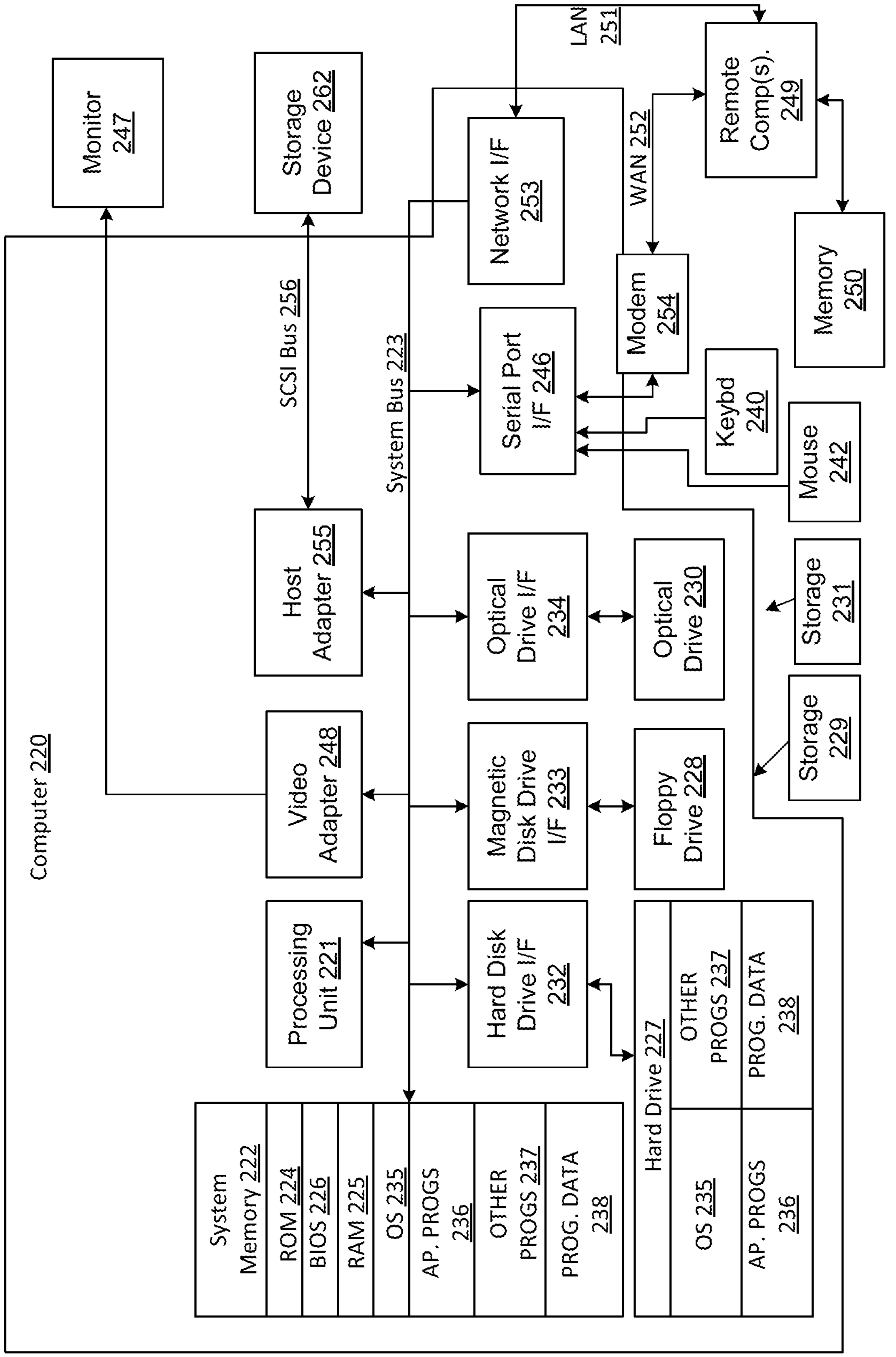
FIG. 3 is an exemplary block diagram representing a computer system in which aspects of the methods and systems disclosed herein or portions thereof may be incorporated.

FIG. 3 and the following discussion are intended to provide a brief general description of a suitable computing environment in which the methods and systems disclosed herein, or portions thereof may be implemented. Although not required, the methods and systems disclosed herein is described in the general context of computer-executable instructions, such as program modules, being executed by a computer, such as a client workstation, server, personal computer, or mobile computing device such as a smartphone. Generally, program modules include routines, programs, objects, components, data structures and the like that perform particular tasks or implement particular abstract data types. Moreover, it should be appreciated the methods and systems disclosed herein and/or portions thereof may be practiced with other computer system configurations, including hand-held devices, multi-processor systems, microprocessor-based or programmable consumer electronics, network PCs, minicomputers, mainframe computers and the like. A processor may be implemented on a single-chip, multiple chips, or multiple electrical components with different architectures. The methods and systems disclosed herein may also be practiced in distributed computing environments where tasks are performed by remote processing devices that are linked through a communications network. In a distributed computing environment, program modules may be located in both local and remote memory storage devices. It is contemplated that the disclosed steps associated with different Figures may be combined. Also, the steps may be distributed over multiple devices or performed primarily on one device.

FIG. 3 is a block diagram representing a computer system in which aspects of the methods and systems disclosed herein and/or portions thereof may be incorporated. As shown, the exemplary general purpose computing system includes a computer 220 or the like, including a processing unit 221, a system memory 222, and a system bus 223 that couples various system components including the system memory to the processing unit 221. The system bus 223 may be any of several types of bus structures including a memory bus or memory controller, a peripheral bus, and a local bus using any of a variety of bus architectures. The system memory includes read-only memory (ROM) 224 and random-access memory (RAM) 225. A basic input/output system 226 (BIOS), containing the basic routines that help to transfer information between elements within the computer 220, such as during start-up, is stored in ROM 224.

The computer 220 may further include a hard disk drive 227 for reading from and writing to a hard disk (not shown), a magnetic disk drive 228 for reading from or writing to a removable magnetic disk 229, and an optical disk drive 230 for reading from or writing to a removable optical disk 231 such as a CD-ROM or other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide non-volatile storage of computer readable instructions, data structures, program modules and other data for the computer 220. As described herein, computer-readable media is a tangible, physical, and concrete article of manufacture and thus not a signal per se.

Although the exemplary environment described herein employs a hard disk, a removable magnetic disk 229, and a removable optical disk 231, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random-access memory (RAM), a read-only memory (ROM), and the like.

A number of program modules may be stored on the hard disk, magnetic disk 229, optical disk 231, ROM 224 or RAM 225, including an operating system 235, one or more application programs 236, other program modules 237 and program data 238. A user may enter commands and information into the computer 220 through input devices such as a keyboard 240 and pointing device 242. Other input devices (not shown) may include a microphone, joystick, game pad, satellite disk, scanner, or the like. These and other input devices are often connected to the processing unit 221 through a serial port interface 246 that is coupled to the system bus, but may be connected by other interfaces, such as a parallel port, game port, or universal serial bus (USB). A monitor 247 or other type of display device is also connected to the system bus 223 via an interface, such as a video adapter 248. In addition to the monitor 247, a computer may include other peripheral output devices (not shown), such as speakers and printers. The exemplary system of FIG. 3 also includes a host adapter 255, a Small Computer System Interface (SCSI) bus 256, and an external storage device 262 connected to the SCSI bus 256.

The computer 220 may operate in a networked environment using logical connections to one or more remote computers, such as a remote computer 249. The remote computer 249 may be a personal computer, a server, a router, a network PC, a peer device or other common network node, and may include many or all of the elements described above relative to the computer 220, although only a memory storage device 250 has been illustrated in FIG. 3. The logical connections depicted in FIG. 3 include a local area network (LAN) 251 and a wide area network (WAN) 252. Such networking environments are commonplace in offices, enterprise-wide computer networks, intranets, and the Internet.

When used in a LAN networking environment, the computer 220 is connected to the LAN 251 through a network interface or adapter 253. When used in a WAN networking environment, the computer 220 may include a modem 254 or other means for establishing communications over the wide area network 252, such as the Internet. The modem 254, which may be internal or external, is connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be used.

Computer 220 may include a variety of computer readable storage media. Computer readable storage media can be any available media that can be accessed by computer 220 and includes both volatile and nonvolatile media, removable and non-removable media. By way of example, and not limitation, computer readable media may comprise computer storage media and communication media. Computer storage media include both volatile and nonvolatile, removable, and non-removable media implemented in any method or technology for storage of information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by computer 220. Combinations of any of the above should also be included within the scope of computer readable media that may be used to store source code for implementing the methods and systems described herein. Any combination of the features or elements disclosed herein may be used in one or more examples.

Figure 4:
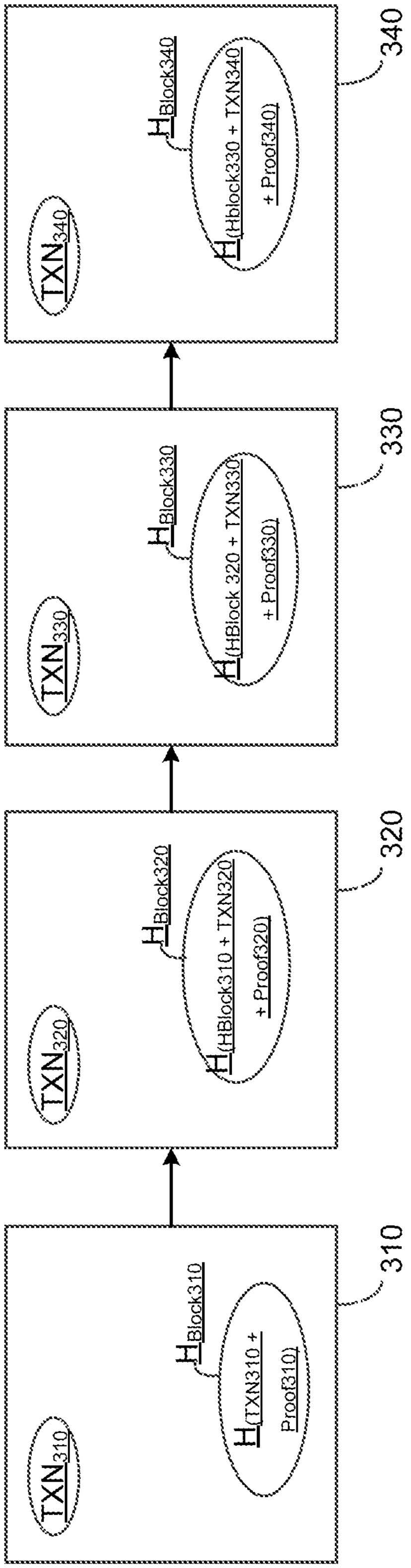
FIG. 4 is an exemplary blockchain architecture.

FIG. 4 shows an example blockchain 300. The blockchain 300 may be stored on nodes of a distributed system. The blockchain 300 may comprise or be similar to a Bitcoin blockchain, an Ethereum blockchain, a FLOW blockchain, a Tezos blockchain, or a Solana blockchain, as examples. The blockchain 300 may comprise one or more blocks 310, 320, 330, 340 in which one or more transactions, such as transactions exchanging NFT's, are recorded. The blocks 310, 320, 330, 340 may be linked in a sequence that represents the chronology of the execution, validation, or recording of the transactions. For example, the blockchain 300 may comprise a genesis block 310 that records the earliest transaction in the blockchain 300 and comprises the first block 310 in the blockchain 300. Each block 320, 330, 340 following the genesis block 310 may record a transaction that was executed, validated, and/or occurred after the transaction in the preceding block 310, 320, 330 in the blockchain 300 was executed, validated, and/or occurred. To illustrate, the block 330 may record transactions (TXN330) that were executed, validated, and/or occurred after the transactions recorded in the block 320 (TXN320) were executed, validated, and/or occurred. A new transaction may be recorded in a new block. The new block may be appended to the last or current block 340 in the blockchain 300.

Although the example blockchain 300 is depicted as comprising 4 blocks 310, 320, 330, 340 the blockchain 300 may comprise less than 4 blocks or more than 4 blocks. The blocks 310, 320, 330, 340 may record transactions as hashes of the transactions ($H_{TXN310}$, $H_{TXN320}$, $H_{TXN330}$, $H_{TXN340}$).

The blocks 310, 320, 330, 340 may function as a mechanism to implement a timestamp server to generate computational proof of the chronological order of the transactions in the blockchain 300. A timestamp of a block 310, 320, 330, 340 may comprise a hash of the transactions (e.g., $TXN_{310}$, $TXN_{320}$, $TXN_{330}$, $TXN_{340}$) of the block 310, 320, 330, 340 and the transactions of the previous block in the blockchain 300. The timestamp may be recorded, such as by publishing. To eliminate the requirement to publish the timestamp, a distributed timestamp server may implement a protocol to achieve distributed chronological consensus, such as a proof protocol. A proof protocol may comprise a proof-of-work protocol, a proof-of-stake protocol, a proof-of-existence protocol, or another proof protocol.

A proof-of-work protocol may comprise solving for a proof (e.g., $Proof_{310}$, $Proof_{320}$, $Proof_{330}$, $Proof_{340}$), such as a string, a cryptographic nonce, or value, that when cryptographically hashed with the transactions of a block and a hash of the previous block yields a hash (e.g., $H_{Block310}$, $H_{Block320}$, $H_{Block330}$, $H_{Block340}$) with a pre-determined number of leading zero bits. For example, a proof may be identified such that the hash has 60 leading bits that are zero.

To illustrate, a proof-of-work for the block 320 may comprise solving for a value (e.g., $Proof_{320}$) that that when hashed with the transactions of the block 320 $TXN_{320}$ and the hash of the previous block 310 $H_{Block310}$ yields an output $H_{Block320}$ that has a pre-determined number of leading zero bits. The next block 330 in the blockchain 300 will be appended to the blockchain 300 when a proof-of-work is performed to identify a proof $Proof_{330}$ which when hashed with the transactions of the block 330 $TXN_{330}$ and the hash of the block 320 $H_{Block320}$ yields an output $H_{Block330}$ with a pre-determined number of leading zero bits. Once the proof is identified, the block 330 may be broadcast through the network. If the block 330 is accepted, the nodes may work on creating the next block 340 in the blockchain 300 using the hash ($H_{Block330}$) of the accepted block 330.

An iterative proof-of-work protocol may deter modification of a block in the chain as it would require re-doing the proof-of-work for each proceeding block in the chain 300. For example, modification of a transaction in the block 310 may require performance of a new proof-of-work for block 310, yielding a new hash ($H_{Block310}$) for the block 310. Consequently, a new proof-of-work may be required for the block 320 using the new hash ($H_{Block310}$) for the block 310, yielding a new hash ($H_{Block320}$) for the block 320. Each subsequent block in the chain 300 may require a new proof-of-work.

In describing preferred examples of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for enabling geofences using satellite systems. A method, system, computer readable storage medium, or apparatus may provide for monitoring wireless signal data (e.g., patterns) within a residence; monitoring other data from the residence (e.g., mobile phone use); correlating wireless signal data and other data to determine behavior; storing the wireless signal data in a blockchain; monitoring the wireless signal data to detect an incident (e.g., event); and executing an action related to the incident. A method, system, computer readable storage medium, or apparatus may provide for receiving first wireless device related information associated with one or more base stations or one or more mobile devices at a location; correlating the wireless device related information associated with the one or more base stations and the one or more mobile devices at the location to determine a behavior pattern; determining an event based on the behavior pattern; and executing an action related to the event. The event may be indicative of a heath related issue of a user associated with the one or more mobile devices, wherein the action comprises sending an alert to emergency personnel. The behavior pattern may be indicative of a trespasser at the location. The wireless device related information using blockchain technology. The action may include activating a camera or light at the location. The alert may be disable or shutdown some or all functionality of a device of a trespasser. All combinations in this paragraph (including the removal or addition of steps) are contemplated in a manner that is consistent with the other portions of the detailed description.

What is claimed is:

1. An apparatus comprising:

a processor; and memory coupled with the processor, the memory storing executable instructions that when executed by the processor cause the processor to effectuate operations comprising:

receiving first wireless device related information associated with one or more base stations communicatively coupled with a local area network router or local area network modem at a location and one or more mobile devices at the location;

identifying based on wireless device related information smart devices that can discover the base station but are not connected to the base station;

correlating the wireless device related information associated with the one or more base stations communicatively coupled with the one of the local area network router or the local area network modem at the location and the one or more mobile devices at the location to determine a behavior pattern;

retrieving, from a blockchain event, data associated with previously determined events sourced from a community of users;

receiving at least one of electronic calendar information, SMS information, or electronic mail information associated with the one or more mobile devices at the location;

determining, with machine learning, the blockchain event based on the behavior pattern, historical wireless device related information, and at least one of the electronic calendar information, SMS information, or electronic mail information associated with one or more mobile devices at the location determining, with machine learning, a label for any discovered but not connected smart device; and executing an action, determined by the machine learning to be related to the blockchain event, wherein the machine learning is trained with historical wireless device related information and blockchain event data, historical electronic calendar information, SMS information, or electronic mail information, wherein the event is determined based on data collected from accelerometers, gyrometers, location data, signal strength, and historical wireless device related information for a plurality of devices connected to the one or more base stations, wherein the event is indicative of a heath related issue of a user associated with the one or more mobile devices, wherein the action comprises sending an alert to emergency personnel.

2. The apparatus of claim 1, wherein the smart device discoverable but not connected to the base station is connected to a different base station.

3. The apparatus of claim 1, wherein the wireless device related information comprises one or more wireless device identifiers and one or more signal strength of the one or more base stations communicatively coupled with a local area network router or local area network modem or the one or more mobile devices.

4. The apparatus of claim 1, wherein the wireless device related information comprises accelerometer information, barometer information, altimeter information, or gyroscope information of the one or more base stations communicatively coupled with the local area network router or the local area network modem or the one or more mobile devices.

5. The apparatus of claim 1, wherein the historical wireless device related information includes data regarding reception of signals from one or more wireless devices over time.

6. The apparatus of claim 1, wherein the location is a residential building, an office building, or industrial building.

7. The apparatus of claim 1, wherein the action is an alert sent to one or more devices connected or not connected to the base station or local area network router or modem.

8. The apparatus of claim 1, wherein the behavior pattern determined is that of an intruder or trespasser at the location.

9. The apparatus of claim 1, wherein the behavior pattern determined is based upon the wireless device related information from multiple known devices and at least one unknown device.

10. A method comprising:

receiving first wireless device related information associated with one or more base stations communicatively coupled with a local area network router or local area network modem and one or more mobile devices at a location;

identifying based on the wireless device related information smart devices that can discover the base station but are not connected to the base station;

correlating the wireless device related information associated with the one or more base stations communicatively coupled with the local area network router or the local area network modem at the location and the one or more mobile devices at the location to determine a behavior pattern;

retrieving, from a blockchain event, data associated with previously determined events sourced from a community of users;

receiving at least one of electronic calendar information, SMS information, or electronic mail information associated with the one or more mobile devices at the location;

determining, with machine learning, the blockchain event based on the behavior pattern, historical wireless device related information, and at least one of the electronic calendar information, SMS information, or electronic mail information associated with one or more mobile devices at the location; and determining, with machine learning, a label for any discovered but not connected smart device; and executing an action, determined by the machine learning to be related to the blockchain event, wherein the machine learning is trained with historical wireless device related information and blockchain event data, historical electronic calendar information, SMS information, or electronic mail information, wherein the event is determined based on data collected from accelerometers, gyrometers, location data, signal strength, and historical wireless device related information for a plurality of devices connected to the one or more base stations.

11. The method of claim 10, wherein the smart device discoverable but not connected to the base station is connected to a different base station.

12. The method of claim 10, wherein the wireless device related information comprises one or more wireless device identifiers and one or more signal strength of the one or more base stations communicatively coupled with a local area network router or local area network modem or the one or more mobile devices.

13. The method of claim 10, wherein the wireless device related information comprises accelerometer information, barometer information, altimeter information, or gyroscope information of the one or more base stations communicatively coupled with the local area network router or the local area network modem or the one or more mobile devices.

14. A non-transitory computer readable storage medium storing computer executable instructions that when executed by a computing device cause said computing device to effectuate operations comprising:

receiving first wireless device related information associated with one or more base stations communicatively coupled with a local area network router or local area network modem and one or more mobile devices at a location;

identifying based on wireless device related information smart devices that can discover the base station but are not connected to the base station;

correlating the wireless device related information associated with the one or more base stations communicatively coupled with the local area network router or the local area network modem and the one or more mobile devices at the location to determine a behavior pattern;

retrieving, from a blockchain event, data associated with previously determined events sourced from a community of users;

receiving at least one of electronic calendar information, SMS information, or electronic mail information associated with the one or more mobile devices at the location;

determining, with machine learning, the blockchain event based on the behavior pattern, historical wireless device related information, and at least one of the electronic calendar information, SMS information, or electronic mail information associated with one or more mobile devices at the location;

determining, with machine learning, a label for any discovered but not connected smart device; and executing an action, determined by the machine learning to be related to the blockchain event, wherein the machine learning is trained with historical wireless device related information and blockchain event data, historical electronic calendar information, SMS information, or electronic mail information, wherein the event is determined based on data collected from accelerometers, gyrometers, location data, signal strength, and historical wireless device related information for a plurality of devices connected to the one or more base stations.

15. The non-transitory computer readable storage medium of claim 14, wherein the behavior pattern is indicative of a trespasser at the location and wherein the action comprises activating a camera or light at the location.

16. The non-transitory computer readable storage medium of claim 14, wherein the wireless device related information comprises one or more wireless device identifiers and one or more signal strength of the one or more base stations communicatively coupled with the local area network router or the local area network modem or the one or more mobile devices.

* * * * *